United States Patent [19]

Pickett

[11] 4,437,730
[45] Mar. 20, 1984

[54] CAMERA ADAPTER

[76] Inventor: Trammell Pickett, 7053 Placida Rd., Englewood, Fla. 33533

[21] Appl. No.: 311,777

[22] Filed: Oct. 15, 1981

[51] Int. Cl.³ .............................................. G02B 7/02
[52] U.S. Cl. .................................... 350/257; 350/247
[58] Field of Search ................ 350/247, 252; 353/101; 354/121, 123, 190, 286

[56] References Cited

U.S. PATENT DOCUMENTS

| | | | |
|---|---|---|---|
| 3,560,080 | 2/1971 | Wilczynski et al. | 350/247 |
| 3,640,195 | 2/1972 | Zimmerman et al. | 354/190 |
| 3,713,725 | 1/1973 | Uesugi | 350/252 |
| 3,745,903 | 7/1973 | Studly | 354/190 |

*Primary Examiner*—William H. Punter
*Attorney, Agent, or Firm*—Arthur W. Fisher, III

[57] ABSTRACT

A lens mount configured to permit relative movement between the camera axis and lens axis while maintaining the image plane and focal plane in substantially parallel relation relative to each other wherein the lens mount comprises an inner and outer movable circular disc disposed in fixed spaced relationship relative to each other by a movable circular disc spacer, an inner stop plate including a circular stop aperture disposed in surrounding relationship relative to the movable circular disc spaces, a tiltable lens mounting ring to operatively receive a lens thereon attached to the outer movable disc, a rear base plate attachable to a camera and a forward housing plate disposed on opposite sides of the inner stop plate, and an inner and outer disc stop plate each including a circular stop aperture disposed in surrounding relationship relative to the inner and outer movable circular discs respectively, the inner and outer movable circular discs, movable circular disc spacer and tiltable lens mounting ring each including a central aperture formed therein in axial alignment relative to each other which together form a lateral adjustment unit movable within the housing comprising the rear base plate and forward housing plate such that the movement of the lateral adjustment unit is limited by the engagement of the lateral adjustment unit with the stop apertures.

6 Claims, 3 Drawing Figures

CAMERA ADAPTER

BACKGROUND OF THE INVENTION

1. Field of the Invention

A lens mount configured to permit relative movement between the camera axis and the lens axis while maintaining the image plane and focal plane in substantially parallel relationship relative to each other.

2. Description of the Prior Art

Various efforts have been made to overcome the effects of distortion and improper focus in the still camera as well as television and motion picture cameras.

It is common to use lens tilting to compensate for the converging verticals and a picture. A larger tilting movement of the lens relative to the optical axis of the camera which axis is normal to the image plane has been provided in numerous examples.

However, the ability to move the camera or optical axis relative to lens axis greatly enhances the minimization of distortion. Moreover, the ability to adjust the image plane relative to the focal plane further produces distortion as well as enhances ability to focus.

Examples of prior art are disclosed in U.S. Pat. Nos. 1,294,333; 3,623,415; 3,667,365; 3,704,658 and 3,838,437. Unfortunately none of these examples either singly or in combination suggest the unique combination of applicant's elements as more fully described hereinafter.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

SUMMARY OF THE INVENTION

Figure 3:
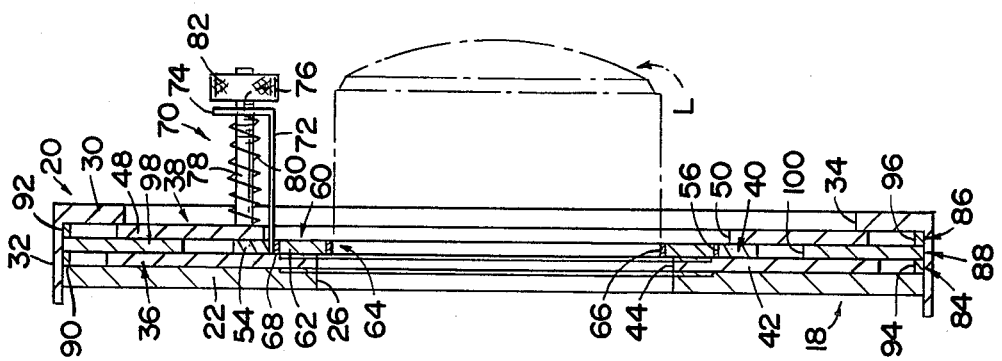
FIG. 3 is a cross sectional side view of the lens mount.
Figure 2:
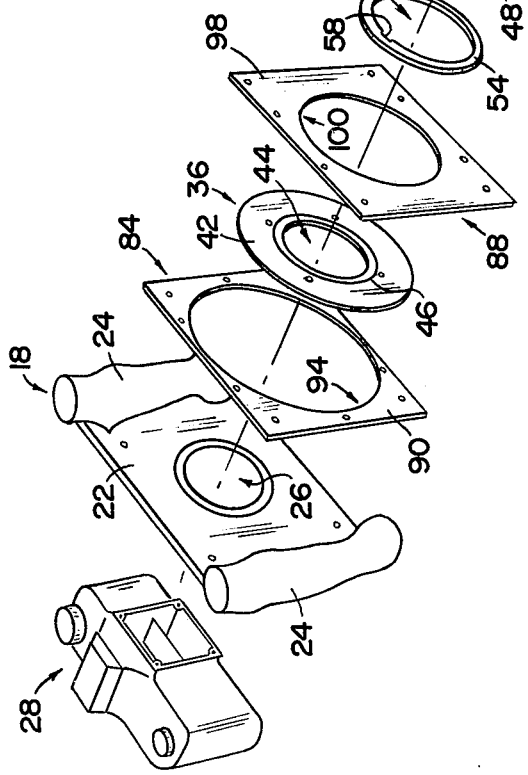
FIG. 2 is an exploded perspective view of the lens mount.
Figure 1:
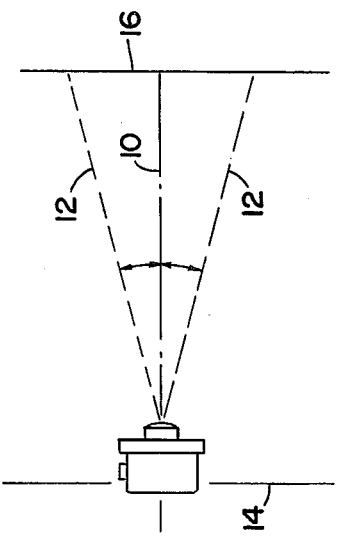
FIG. 1 is a schematic view of a camera and lens mount.

The present invention relates to a lens mount configured to permit relative movement between the camera axis and the lens axis while maintaining the image plane and focal plane in substantially parallel relation relative to each other. The lens mount comprises a housing to operatively retain a lateral adjustment means in limited movable relation relative to a stop means as more fully described hereinafter.

The housing comprises a rear base plate and forward housing plate. The rear base plate includes a pair of handles and a centrally disposed apertures formed therein. The rear base plate is attachable to the camera with any suitable attachment means to affix the lens mount to the camera. The foward housing plate includes a flange formed about the periphery thereof and a centrally disposed aperture formed therein. Apertures are coaxially aligned relative to each other.

The lateral adjustment means comprises an inner and outer movable disc disposed in fixed spaced relation relative to each other by a movable disc space. The inner and outer movable discs and movable disc space each includes a centrally disposed aperture firmed therein in coaxial alignment relative to each other. The lateral adjustment means further includes a tiltable lens mounting ring including a centrally disposed aperture formed therein. An L-shaped control arm is affixed to the tiltable lens mounting ring.

The stop means comrises an inner and outer disc stop plate affixed on opposite sides of inner stop plate including an inner and outer stop aperture centrally formed therein. The inner stop plate includes a stop plate aperture centrally formed therein. These apertures are coaxially aligned relative to each other.

When assembled the inner and outer movable discs are disposed within inner and outer stop apertures respectively while the spacer is disposed within the stop plate aperture between surface of the rear base plate and the inner surface of forward housing plate with the control arm extending through the forward housing plate.

With the lens mount retaining a lens on the camera, the lens attached to the tiltable lens mounting ring is laterally movable on the lateral adjustment means by manually moving the control arm. Since the discs and spacer are disposed within the stop aperture, lateral movement is limited by operative engagement therebetween. Moreover the lens may be tilted by adjusting the control arm.

The invention accordingly comprises the features of construction, combination of elements, and arrangement of parts that will be exemplified in the construction hereinafter set forth, and the scope of the invention will be indicated in the claims.

DETAILED DESCRIPTION OF THE PREFERRED EMBODIMENT

The present invention relates to a lens mount configured to permit relative movement between the camera axis 10 and the lens axes 12 while maintaining the image plane 14 and focal plane 16 in substantially parallel relation relative to each other. The lens mount comprises a housing to operatively retain a lateral adjustment means in limited movable relation relative to a stop means as move fully described hereinafter.

The housing comprises a rear base plate and forward housing plate generally indicated as 18 and 20 respectively. The rear base plate 18 comprises a rear base plate member 22 including a pair of handles each indicated as 24 attached to opposite sides thereof and a centrally disposed aperture 26 formed therein. The rear base plate member 22 is attachable to the camera 28 with any suitable attachment means to affix the lens mount to the camera 28. The forward housing plate 20 comprises a forward housing plate member 30 including a flange 32 formed about the periphery thereof and a centrally disposed aperture 34 formed therein. Apertures 26 and 34 are coaxially aligned relative to each other.

The lateral adjustment means comprises an inner and outer movable discs generally indicated as 36 and 38 respectively disposed in fixed spaced relation relative to each other by a movable disc spacer generally indicated as 40. The inner movable disc 36 comprises an inner circular member 42 including a centrally disposed aperture 44 formed therein. A seal 46 is countersunk about the periphery of the aperture 44. The outer movable disc 38 comprises an outer circular member 48 including a centrally disposed aperture 50 formed therein having a retaining notch 52 formed in the periphery thereof. The movable disc spacer 40 comprises a circular spacer member 54 having a centrally disposed aperture 56 formed therein having a retaining notch 58 formed in the periphery thereof. The lateral adjustment means further includes a tiltable lens mounting ring generally indicated as 60. The tiltable lens mounting ring 60 comprises a circular mounting member 62 including a centrally disposed aperture 64 formed therein together with an inner and outer seal 66 and 68 respectively to receive a lens thereon. The lens mounting ring 60 is movably mounted within a circular spacer member 54 by tilt pins 69 which engage the inner periphery thereof. An L-shaped control arm generally indicated as 70 is affixed to the circular mounting member 62. An inner leg 72 engages notches 52 and 58 to maintain alignment and operative coupling of the lateral adjustment means. The outer leg 74 includes an aperture 76 to receive a post 78 having a bias 80 extending outwardly from the outer movable disc 38. The post 78 is threaded to receive a fastner 82 thereon. Apertures 44, 50, 56 and 64 are coaxially aligned relative to each other.

The stop means comprises an inner and outer disc stop plate generally indicated as 84 and 86 respectively affixed on opposite sides of inner stop plate generally indicated 88. The inner and outer disc stop plates 84 and 86 comprise inner and outer stop member 90 and 92 respectively including an inner and outer stop aperture 94 and 96 centrally formed therein. The inner stop plate 88 comprises a stop plate member 98 including a stop plate aperture 100 centrally formed therein. Apertures 94, 96 and 100 are coaxially aligned relative to each other.

When assembled the inner and outer circular members 42 and 48 are disposed within inner and outer stop apertures 94 and 96 respectively while the circular spacer member 54 is disposed within the stop plate aperture 100 between the inner surface of rear base plate member 22 and the inner surface of forward housing plate member 30 with the control arm 70 extending through aperture 34.

With the lens mount retaining a lens on the camera 28, the lens attached to the tiltable lens mounting ring 60 is laterally movable on the lateral adjustment means by manually moving the control arm 70. Since circular members 42, 48 and 54 are disposed with stop aperture 94, 96 and 100 respectively lateral movement is limited by operative engagement therebetween. Moreover the lens may be tilted by adjusting fastner 82 relative to the post 78 causing the outer leg 74 to move along post 78 in turn moving lens mounting ring 60 coupled to the control arm 70.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all the generic and specific features of the invention herein described, and all statement of the scope of the invention which as a matter of language, might be said to fall therebetween.

Now that the invention has been described,

What is claimed is:

1. A lens mount configured to permit relative movement between the camera axis and lens axis while maintaining the image plane and focal plane in substantially parallel relation relative to each other: said lens mount comprising a housing to operatively retain an adjustment means in limited movable relation relative to a stop means, said adjustment means comprising an inner and outer movable disc held in a fixed spaced relation relative to each other by a movable disc spacer disposed therebetween, a movable lens mounting ring to operatively receive a lens thereon coupled to said outer movable disc, said inner and outer movable disc, said movable disc spacer and said movable lens mounting ring each including a centrally disposed aperture formed therein, each said central disposed aperture coaxially aligned relative to said other centrally disposed aperture, said stop means comprising an inner stop plate including a centrally disposed stop aperture formed therein affixed to said housing, said movable disc spacer being movably disposed within said stop aperture such that the outer periphery of said movable disc spacer is engagable with the periphery of said stop aperture as said adjustment means is moved relative to said housing and said inner stop plate to limit the lateral movement of said adjustment means relative to said housing.

2. The lens mount of claim 1 where in said stop means further include an inner and outer disc stop disc stop plate each including a centrally disposed aperture formed thereon affixed to said housing on opposite sides of said inner stop plate, said inner and outer movable discs being movably disposed with said centrally disposed apertures of said inner and outer disc stop plates respectively such that the outer periphery of said inner and outer movable discs are engagable with the periphy of said centrally disposed apertures of said inner and outer disc stop plates respectively to limit the lateral movement of said adjustment means relative to said housing.

3. The lens mount of claim 2 wherein said inner and outer movable disc comprise an inner and outer movable circular disc respectively and said movable disc spacer comprises a movable circular disc spacer, and said centrally disposed apertures of said inner stop plate and inner and outer disc stop plates are circular in configuration.

4. The lens mount of claim 1 wherein said adjustment means further includes a control arm attached thereto to laterally adjust said adjustment means relative to said housing.

5. The lens mount of claim 4 wherein said control arm comprises an inner leg attached to said movable lens mounting ring and an outer leg including an aperture formed therein to receive post extending outwardly from said outer movable disc, a bias mounted on said post and a fastner movably coupled to said post such that movement of said fastner relative to said post tilts said adjustment means relative to said housing.

6. The lens mount of claim 5 wherein said outer movable circular disc and said movable circular disc spacer each include a notch to receive the inner portion of said inner leg.

* * * * *